United States Patent
Yu

(10) Patent No.: US 9,285,615 B2
(45) Date of Patent: Mar. 15, 2016

(54) STRUCTURE FOR FIXING FRAMES AND LCD DEVICE

(75) Inventor: Gang Yu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 717 days.

(21) Appl. No.: 13/504,042

(22) PCT Filed: Apr. 5, 2012

(86) PCT No.: PCT/CN2012/073511
§ 371 (c)(1),
(2), (4) Date: Apr. 25, 2012

(87) PCT Pub. No.: WO2013/117036
PCT Pub. Date: Aug. 15, 2013

(65) Prior Publication Data
US 2013/0200763 A1 Aug. 8, 2013

(30) Foreign Application Priority Data
Feb. 8, 2012 (CN) .......................... 2012 1 0027531

(51) Int. Cl.
*F21V 7/04* (2006.01)
*G02F 1/1333* (2006.01)

(52) U.S. Cl.
CPC *G02F 1/133308* (2013.01); *G02F 2001/13332* (2013.01); *G02F 2001/133314* (2013.01); *Y10T 403/7045* (2015.01)

(58) Field of Classification Search
CPC ................ G02F 1/13308; G02F 2001/133314; G02F 2001/13332; Y10T 403/7045
USPC .......................................................... 362/633
See application file for complete search history.

(56) References Cited

U.S. PATENT DOCUMENTS 6,976,781 B2 12/2005 Chu et al.
2007/0171323 A1* 7/2007 Lin .................................. 349/58
(Continued)

FOREIGN PATENT DOCUMENTS

| CN | 1409207 A | 4/2003 |
|---|---|---|
| CN | 101206317 A | 6/2008 |
| CN | 101765803 A | 6/2010 |
| CN | 102236181 A | 11/2011 |
| CN | 202057922 U | 11/2011 |

(Continued)

*Primary Examiner* — Bao Q Truong
*Assistant Examiner* — Hana Featherly
(74) *Attorney, Agent, or Firm* — IPro, PLLC; Na Xu

(57) ABSTRACT

The invention discloses a structure for fixing frames and an LCD device. The structure for fixing frames includes a first frame and a second frame. The second frame is located inside of the first frame. Convex modules and countersinks are arranged in pairs on a contact surface between the first frame and the second frame. The convex modules are embedded into the countersinks for fixing the first frame and the second frame. The countersinks are blind holes. In the invention, because the frames are fixed by matching the countersinks with the convex modules and the countersinks are blind holes, no hollow structure is formed on the frame provided with the countersinks. Compared with the mounting structure having the through holes, the strength of the frames is significantly improved. When the two frames required to be installed are aligned and pressed, the convex modules is embedded into the countersinks for assembling the frames. This is a simple and efficient assembly method.

8 Claims, 2 Drawing Sheets

(56) References Cited

U.S. PATENT DOCUMENTS

2010/0080020 A1    4/2010   Lin et al.
2012/0106035 A1*   5/2012   Chen ........................ 361/679.01

FOREIGN PATENT DOCUMENTS

| | | |
|---|---|---|
| CN | 202472186 U | 10/2012 |
| TW | 572220 U1 | 1/2004 |

* cited by examiner

STRUCTURE FOR FIXING FRAMES AND LCD DEVICE

TECHNICAL FIELD

The invention relates to the field of liquid crystal displays (LCDs), and more particularly to a structure for fixing frames and an LCD device.

BACKGROUND

In the conventional design of a backlight module, clamping hooks are used for positioning the frames, so as to save cost and reduce assembly time. As shown in FIG. 1, the backlight module includes a middle frame 300 and a back frame 400 of an LCD device. The middle frame of the LCD device includes holes 310. The back frame of the LCD device includes convex structures 410; and the holes are matched with the convex structures for positioning. In other designs, the holes are arranged on the back frame of the LCD device and the convex structures are arranged on the middle frame of the LCD device.

U.S. Pat. No. 6,976,781B2, published on Oct. 20, 2005, discloses a structural frame and a baffle of a backlight unit. The backlight unit includes a frame which includes a first edge and a second edge. A first hook on an outer surface of the first edge protrudes outwardly; and the outer surface of the second edge includes a first hole. The baffle includes a first side wall and a second side wall. The first side wall includes a second hole and the outer surface of the second side wall includes a second hook which protrudes outwardly. The frame is installed on the baffle. The first edge is arranged on the inner surface of the first side wall. The first hook is embedded into the first hole for fixing the frame and the baffle. The second hook is arranged on the surface of the second side wall and embedded into the second hole for fixing the frame and the baffle. Although the frames can be fixed using the above scheme, the strength of parts is reduced as a result of any hole on parts.

SUMMARY

The aim of the invention is to provide a structure for fixing frames and an LCD device with easy installation and high strength.

The aim of the invention is achieved by the following technical schemes:

A structure for fixing frames comprises a first frame and a second frame which is located inside of the first frame; convex modules and countersinks are arranged in pairs on a contact surface between the first frame and the second frame; the convex modules are embedded into the countersinks for fixing the first frame and the second frame; and the countersinks are blind holes.

Preferably, the bottoms of the countersinks protrude from the outer surface of the first frame or the second frame to form internally hollow hillock structures. The countersinks are the blind holes, if their bottoms do not protrude from the outer surface of the first frame or the second frame, to ensure installation strength, the countersinks cannot be too shallow, which will inevitably lead to a thicker side wall of the first frame or the second frame provided with the countersinks and thus increase material cost; if the bottoms of the countersinks protrude from the outer surface of the first frame or the second frame, it is not necessary to thicken the side wall of the first or second frame. Thus, the purpose of reducing the cost is achieved. Besides, a double-protrusion structure can also play a role similar to a stiffener and further strengthen the frame.

Preferably, the convex modules are arranged on the second frame, and the first frame is provided with the matched countersinks. The hillock structures of the countersinks are toward the outside of the LCD device and do not occupy an inner installing space, thereby facilitating the arrangement of the components within the frames.

Preferably, the convex modules are arranged on the first frame, and the second frame is provided with the matched countersinks. The hillocks of the countersinks are toward the inside of the frame and avoid enlarging the external dimensions of the convex modules; besides, the components having concave holes can be matched with the hillocks for fixing the components, simplifying the fixed structure, and reducing the processing cost.

Preferably, the countersinks are square, and the convex modules are provided with at least one inclined inserting surface in an installation direction. The surfaces that intersect the side wall of the first or second frame in the square countersinks are planes, and the square countersinks are almost perpendicular to the side wall and have better positioning effect; it is convenient to introduce the convex modules into the square countersinks for fixing the convex modules by arranging one inclined inserting surface on the convex modules.

Preferably, the first frame is used as a middle frame of the LCD device and the second frame is used as a back frame of the LCD device. This is a specific structure for fixing frames.

Preferably, the first frame is used as a front frame of the LCD device and the second frame is used as a middle frame of the LCD device. This is another specific structure for fixing frames.

Preferably, the first frame is used as a front frame of the LCD device and the second frame is used as a back frame of the LCD device. This is the third specific structure for fixing frames.

An LCD device comprises the aforementioned structure for fixing frames.

In the invention, because the frames are fixed by matching the countersinks with the convex modules and the countersinks are blind holes, the hollow structures will not be formed on the frame provided with the countersinks. Compared with the mounting structure having the through holes, the strength of the frames is significantly improved. When the two frames required to be installed are aligned and pressed, the convex modules can be embedded into the countersinks for assembling the frames. This is a simple and efficient assembly method.

Legends: 100. first frame; 110. countersink; 200. second frame; 210. convex module; 300. middle frame of LCD device; 310. hole; 400. back frame of LCD device; 410. convex structure.

DETAILED DESCRIPTION

The invention will further be described in detail in accordance with the figures and the preferred examples.

Figure 1:
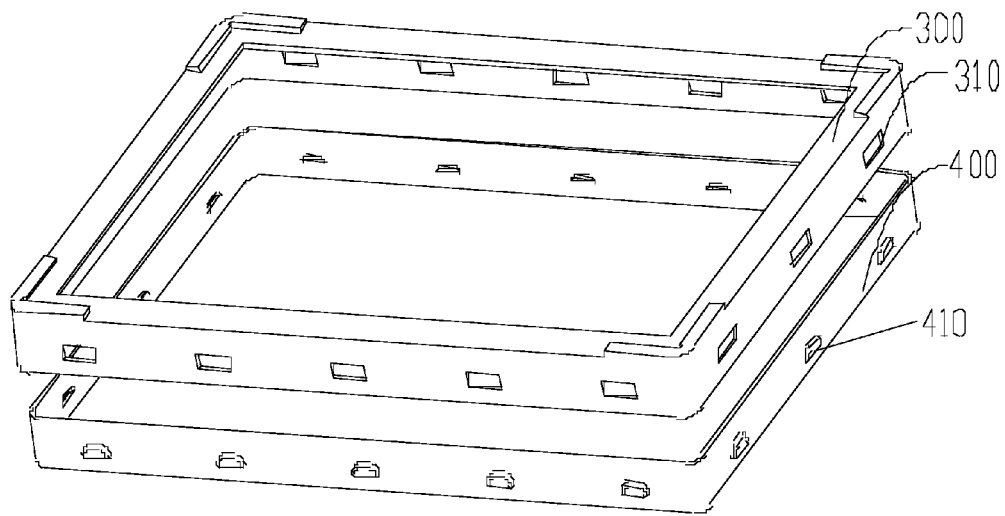
FIG. 1 is a schematic diagram of a matching structure of a middle frame and a back frame of a conventional LCD device.
Figure 2:
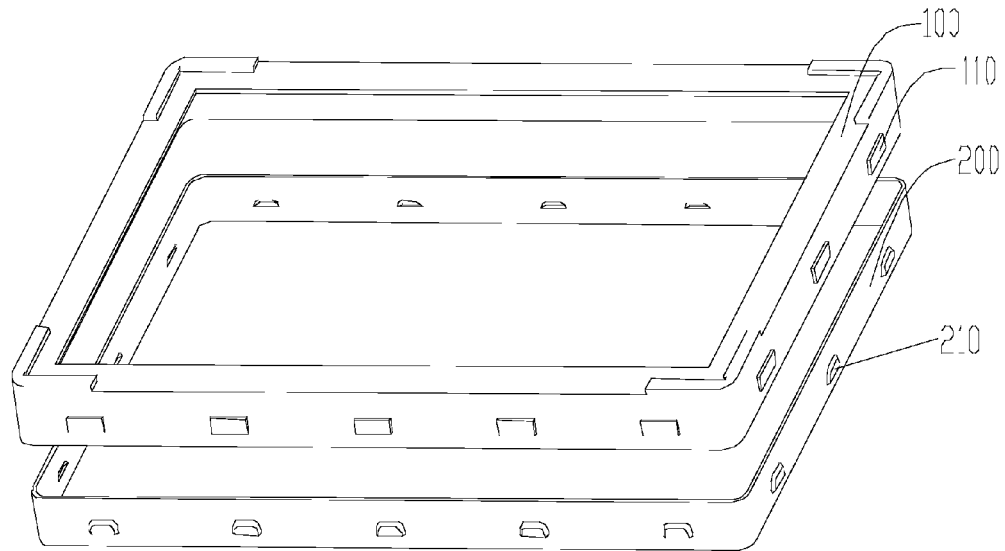
FIG. 2 is a three-dimensional view of the invention.

As shown in FIG. 2, an LCD device comprises a structure for fixing frames. The structure for fixing frames comprises a first frame 100 and a second frame 200 which is positioned inside of the first frame 100. Convex modules 210 and countersinks 110 are arranged in pairs on a contact surface between the first frame 100 and the second frame 200. The convex modules 210 are embedded into the countersinks 110 for fixing the first frame 100 and the second frame 200, and the countersinks 110 are blind holes. The first frame and the second frame can be superposed and fixed on the side surface of the LCD device as well as on the bottom surface or top surface of the LCD device.

To avoid increasing the extra thickness of the frames, the bottoms of the countersinks 110 protrude from an outer surface of the first frame 100 or the second frame 200 to form an internally hollow hillock structure.

Figure 3:
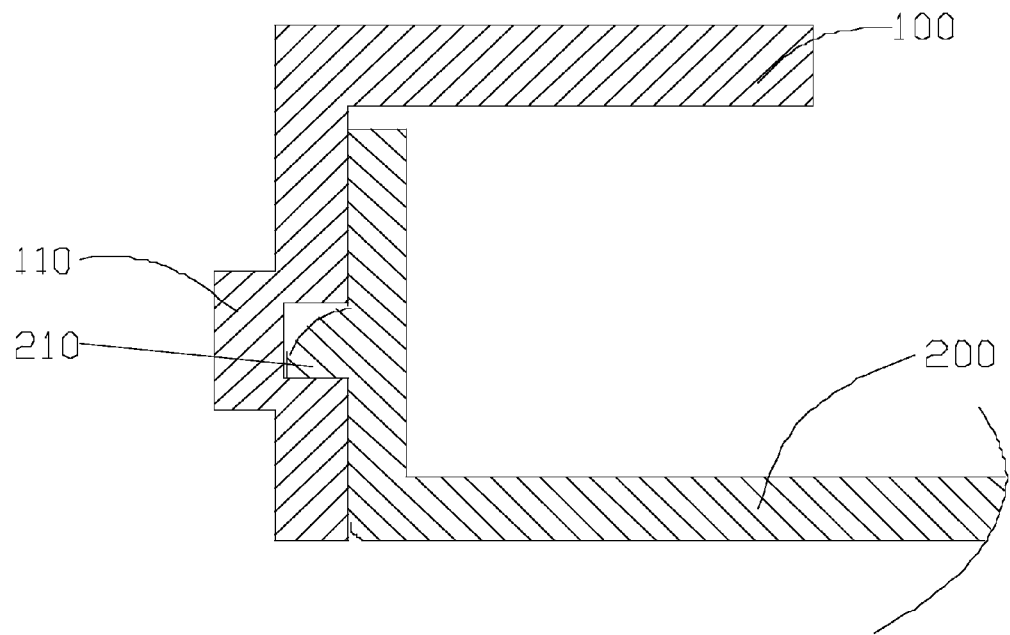
FIG. 3 is a schematic diagram showing that convex modules are arranged on a second frame of the invention.
Figure 4:
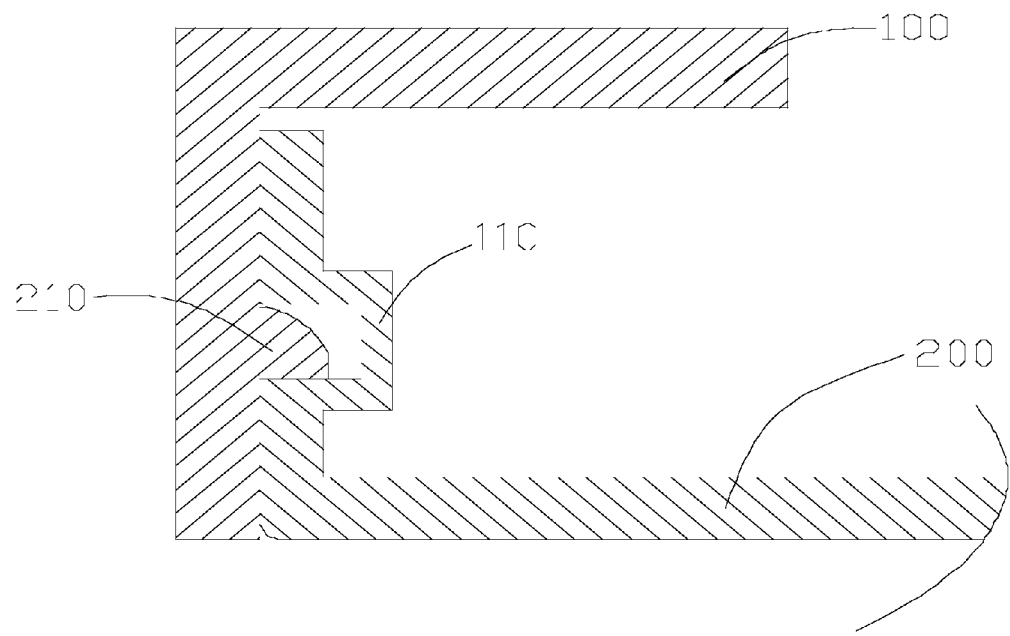
FIG. 4 is a schematic diagram showing that convex modules are arranged on a first frame of the invention.

As shown in FIG. 3, the convex modules 210 are arranged on the second frame 200, and correspondingly, the countersinks 110 are arranged on the first frame 100. Thus, the hillock structures of the countersinks 110 are toward the outside of the LCD device and do not occupy the inner mounting space, thereby facilitating the arrangement for components within the frames. Of course, the convex modules 210 can also be arranged on the first frame 100, and correspondingly, the countersinks 110 can be arranged on the second frame 200, as shown in FIG. 4. Thus, the hillocks of the countersinks 110 are toward the inside of the frames and can avoid enlarging the external dimensions of the convex modules; besides, the components having concave holes can be matched with the hillocks for fixing the components, thereby simplifying the fixed structure, and reducing the machining cost.

The countersinks 110 may be square, cylindrical, and wedge-shaped, etc., and the square countersinks 110 are preferable. The surfaces that intersect the side wall of the first frame 100 or the second frame 200 in the square countersinks 110 are planes, and the square countersinks are almost perpendicular to the side wall and have better positioning effect. To facilitate the embodiment of the convex modules 210 into the countersinks 110, the convex modules 210 can be provided with at least one inclined inserting surface in the installation direction.

There are various combinations between the first frame 100 and the second frame 200, for example: the first frame 100 is used as a middle frame of the LCD device and the second frame 200 is used as a back frame of the LCD device; the first frame 100 is used as a front frame of the LCD device and the second frame 200 is used as a middle frame of the LCD device; and the first frame 100 is used as a front frame of the LCD device and the second frame 200 is used as a back frame of the LCD device. Therefore, the fixing structure is almost common for matching the frames of the LCD device.

In the invention, because the frames are fixed by matching the countersinks 110 with the convex modules 210 and the countersinks 110 are blind holes, no hollow structure is formed on the frame provided with the countersinks 110. Compared with the mounting structure having the through holes, the strength of the frames is significantly improved. When the two frames required to be installed are aligned and pressed, the convex modules 210 can be embedded into the countersinks 110 for assembling the frames. It is a simple and efficient assembly method by which the convex modules 210 and the countersinks 110 are easy to process and thus facilitate cost reduction.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. A structure for fixing frames, comprising: a first frame and a second frame; wherein said second frame is located inside of the first frame; convex modules and countersinks are arranged in pairs on a contact surface between said first frame and said second frame; said convex modules are embedded into said countersinks for fixing the first frame and the second frame; and said countersinks are blind holes, wherein the bottoms of said countersinks protrude from the outer surface of the first frame or the second frame to form an internally hollow hillock structure, wherein said convex modules are arranged on the first frame; and said second frame is provided with the matched countersinks, the second frame comprises a side wall defining the countersinks, and a part of an inner surface of the side wall opposite and corresponding to the countersinks is non-coplanar with another part of the inner surface of the side wall, wherein said countersinks are square; and said convex modules are provided with at least one inclined inserting surface in an installation direction, and said convex modules are fan-shaped.

2. The structure for fixing frames of claim 1, wherein said first frame is used as a middle frame of an LCD device; and said second frame is used as a back frame of the LCD device.

3. The structure for fixing frames of claim 1, wherein said first frame is used as a front frame of the LCD device; and said second frame is used as a middle frame of the LCD device.

4. The structure for fixing frames of claim 1, wherein said first frame is used as a front frame of the LCD device; and said second frame is used as a back frame of the LCD device.

5. An LCD device, comprising: a structure for fixing frames; the structure for fixing frames comprises a first frame and a second frame; said second frame is located inside of the first frame; convex modules and countersinks are arranged in pairs on a contact surface between said first frame and said second frame; said convex modules are embedded into said countersinks for fixing the first frame and the second frame; and said countersinks are blind holes, wherein the bottoms of said countersinks protrude from the outer surface of the first frame or the second frame to form an internally hollow hillock structure, wherein said convex modules are arranged on the first frame; and said second frame is provided with the matched countersinks, the second frame comprises a side wall defining the countersinks, and a part of an inner surface of the side wall opposite and corresponding to the countersinks is non-coplanar with another part of the inner surface of the side wall, wherein said countersinks are square; and said convex modules are provided with at least one inclined inserting surface in an installation direction, and said convex modules are fan-shaped.

6. The LCD device of claim 5, wherein said first frame is used as a middle frame of the LCD device; and said second frame is used as a back frame of the LCD device.

7. The LCD device of claim 5, wherein said first frame is used as a front frame of the LCD device; and said second frame is used as a middle frame of the LCD device.

8. The LCD device of claim 5, wherein said first frame is used as a front frame of the LCD device; and said second frame is used as a back frame of the LCD device.

* * * * *